United States Patent
Pederson et al.

(10) Patent No.: US 8,870,297 B2
(45) Date of Patent: Oct. 28, 2014

(54) RECLAIMING DRUM HAVING REVERSIBLE KICKER PADDLE

(75) Inventors: Nicholas R. Pederson, Willmar, MN (US); Brian J. Schlenker, Plymouth, MN (US); Maria L. Biberdorf, Maple Grove, MN (US); Jason W. Muir, Andover, MN (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 13/526,944

(22) Filed: Jun. 19, 2012

(65) Prior Publication Data

US 2013/0334866 A1 Dec. 19, 2013

(51) Int. Cl.
*E21C 35/18* (2006.01)

(52) U.S. Cl.
USPC .......... 299/39.4; 299/39.1; 299/39.8; 299/64; 299/104; 299/105

(58) Field of Classification Search
CPC . B28D 1/188; E01C 23/088; E01C 2035/191; E01C 23/065; E02F 7/00; E21C 35/183; E21C 2035/191
USPC ............. 299/39.1, 39.2, 39.4, 39.6, 39.8, 64, 299/87.1, 104, 105
See application file for complete search history.

(56) References Cited

U.S. PATENT DOCUMENTS

| 5,125,720 | A |  | 6/1992 | Salani |
| 5,893,677 | A |  | 4/1999 | Haehn et al. |
| 7,293,729 | B2 |  | 11/2007 | Ragnarsson |
| 7,370,916 | B2 | * | 5/2008 | Ley et al. ..................... 299/39.2 |
| 7,475,949 | B2 |  | 1/2009 | Helsel et al. |
| D624,940 | S | * | 10/2010 | Buhr et al. ..................... D15/28 |
| 2008/0093912 | A1 |  | 4/2008 | Willoughby |
| 2010/0244544 | A1 |  | 9/2010 | Buhr et al. |

FOREIGN PATENT DOCUMENTS

| EP | 0462485 | 5/1995 |
| EP | 1039036 | 9/2000 |
| WO | 2008076690 | 6/2008 |

OTHER PUBLICATIONS

Caterpillar, "RM500 Rotary Mixer", Jul. 2007, pp. 1-16.*
Kennametal Inc., Engineering Your Competitive Edge, "Road Rehabilitation" pp. 1-39 (2007).

* cited by examiner

*Primary Examiner* — John Kreck
*Assistant Examiner* — Carib Oquendo
(74) *Attorney, Agent, or Firm* — Finnegan, Henderson, Farabow, Garrett & Dunner LLP (57) ABSTRACT

A kicker paddle is disclosed for use with a reclaiming drum. The kicker paddle may have a block with a first end and a second end. The kicker paddle may also have a mounting mechanism located between the first and second ends. The kicker paddle may be symmetric relative to a plane passing through the mounting mechanism that is parallel to the first and second ends.

17 Claims, 9 Drawing Sheets

RECLAIMING DRUM HAVING REVERSIBLE KICKER PADDLE

TECHNICAL FIELD

The present disclosure relates generally to a kicker paddle and, more particularly, to a reversible kicker paddle for a reclaiming drum.

BACKGROUND

Roadways are built to facilitate vehicular travel. However, depending upon usage density, base conditions, temperature variation, moisture variation, and/or physical age, the surface of the roadways can eventually become misshapen, non-planar, unable to support wheel loads, or otherwise unsuitable for vehicular traffic. In order to promote continued use of the roadways, machines known as "road reclaimers" are employed to rehabilitate the roadways. A road reclaimer pulverizes the surface of the roadway and mixes the pulverized material with the underlying base to stabilize and reshape the roadway. The road reclaimer can also add asphalt emulsions or other binding agents during pulverization to enhance particular properties of the roadway.

A road reclaimer typically includes a frame quadrilaterally supported by tracked or wheeled drive units. The frame provides mounting for an engine, an operator's station, and a reclaiming drum. The reclaiming drum, fitted with cutting tools, is rotated through a suitable interface by the engine to pulverize the roadway.

In a typical configuration, multiple cutting tools extend from an external surface of the reclaiming drum in a spaced apart non-repeating checkerboard configuration. Each cutting tool includes a dedicated flighting that is welded to the reclaiming drum, a mounting block that is connected to the flighting, and a cutting bit that is held within the mounting block. During operation, the reclaiming drum is rotated to drive the cutting bits into the roadway surface and fragment the surface, and the flightings are pushed through the fragmented material to break the fragmented material into smaller particles. An exemplary road reclaimer is disclosed in U.S. Pat. No. 5,893,677 of Haehn et al. that issued on Apr. 13, 1999.

Although effective, operation of a conventional road reclaimer wears down the mounting blocks and flightings of the reclaiming drum. Historically, the mounting blocks and flightings have been protected from excessive wear by way of kicker paddles located at leading edges of the cutting tools. The kicker paddles are welded to individual flightings to deflect material away from the flightings and mounting blocks. In this configuration, the kicker paddles themselves function to pulverize the fragmented material, while also acting as sacrificial wear components.

Although conventional kicker paddles may be effective, they may also be costly, difficult, and time-consuming to replace. Specifically, after a period of use, each kicker paddle must be cut off of the flighting and a new kicker paddle must be welded in its place. This service is generally performed in a service facility and often results in extensive downtime of the road reclaimer.

The kicker paddles and reclaiming drum of the present disclosure solve one or more of the problems set forth above and/or other problems in the art.

SUMMARY

In one aspect, the present disclosure relates to a kicker paddle for a reclaiming drum. The kicker paddle may include a block having a first end and a second end. The kicker paddle may also include a mounting mechanism located between the first and second ends. The kicker paddle may be symmetric relative to a plane passing through the mounting mechanism that is parallel to the first and second ends.

In another aspect, the present disclosure may be related to a cutting tool for a reclaiming drum. This cutting tool may include a plate-like flighting configured to be welded to the reclaiming drum at a first end in general alignment with a rotational direction of the reclaiming drum. The cutting tool may also include a rectangular block removably connectable to a leading edge of the plate-like flighting in an orthogonal orientation relative to the rotational direction of the reclaiming drum. The rectangular block may have a first end and a second end. The cutting tool may further include a mounting mechanism located between the first and second ends. The kicker paddle may be symmetric relative to a plane passing through the mounting mechanism that is parallel to the first and second ends. The cutting tool may additionally include a cutting bit operatively connected to a second end of the plate-like flighting opposite the reclaiming drum.

In yet another aspect, the present disclosure may be related to a method of servicing a reclaiming drum. The method may include removing at least one fastener that passes through a kicker paddle and a flighting, and detaching the kicker paddle from the flighting. The method may also include inverting the kicker paddle and reattaching the kicker paddle to the flighting. The method may further include reinserting the at least one fastener back through the flange of the kicker paddle and the flighting.

DETAILED DESCRIPTION

Figure 1:
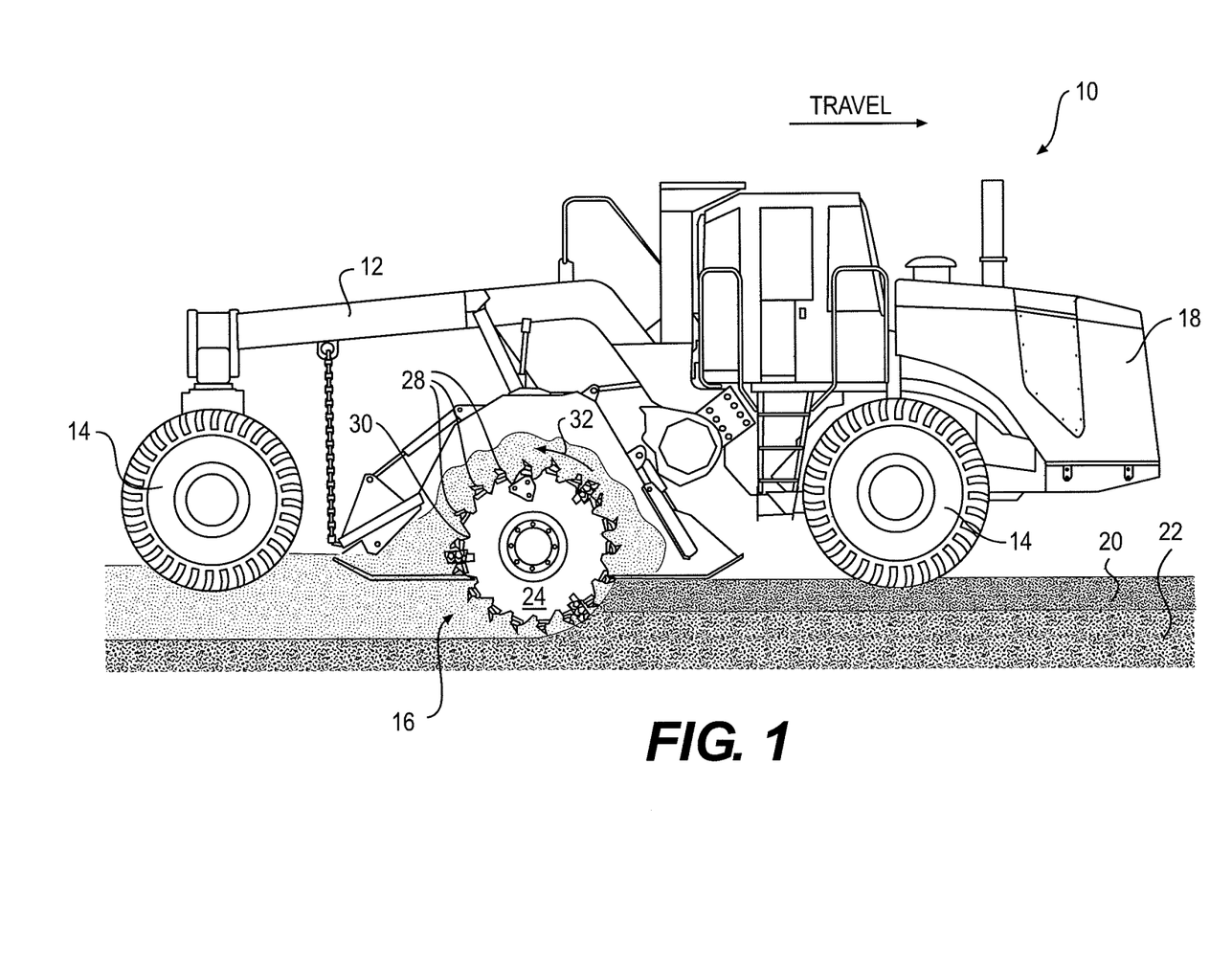
FIG. 1 is a pictorial illustration of an exemplary disclosed road reclaimer.

FIG. 1 illustrates an exemplary road reclaimer 10. Road reclaimer 10 may include a frame 12 connected to one or more traction units 14, and a reclaiming drum 16 supported from frame 12 at a general center of road reclaimer 10 between traction units 14. Traction units 14 may each include either a wheel or a track section that is pivotally connected to frame 12. An engine 18 (or other power source) may be configured to electrically, mechanically, hydraulically, and/or pneumatically power traction units 14 and reclaiming drum 16.

Reclaiming drum 16 may include components rotationally driven by engine 18 to pulverize asphalt and/or other material of a roadway surface 20 and to mix the pulverized material with a base 22 located below roadway surface 20. In some embodiments, an additive such as a soil stabilizer may also be mixed in with the asphalt and base to provide enhanced characteristics, if desired. Reclaiming drum 16 may include a rotary head 24 having a plurality of cutting tools 28 spaced apart along a cylindrical outer surface 30 in a general non-repeating checkerboard pattern. Cutting tools 28 may be pointed in a direction of rotation (indicated by an arrow 32), such that a tip end of each cutting tool 28 is driven into roadway surface 20 by the rotation.

Figure 2:
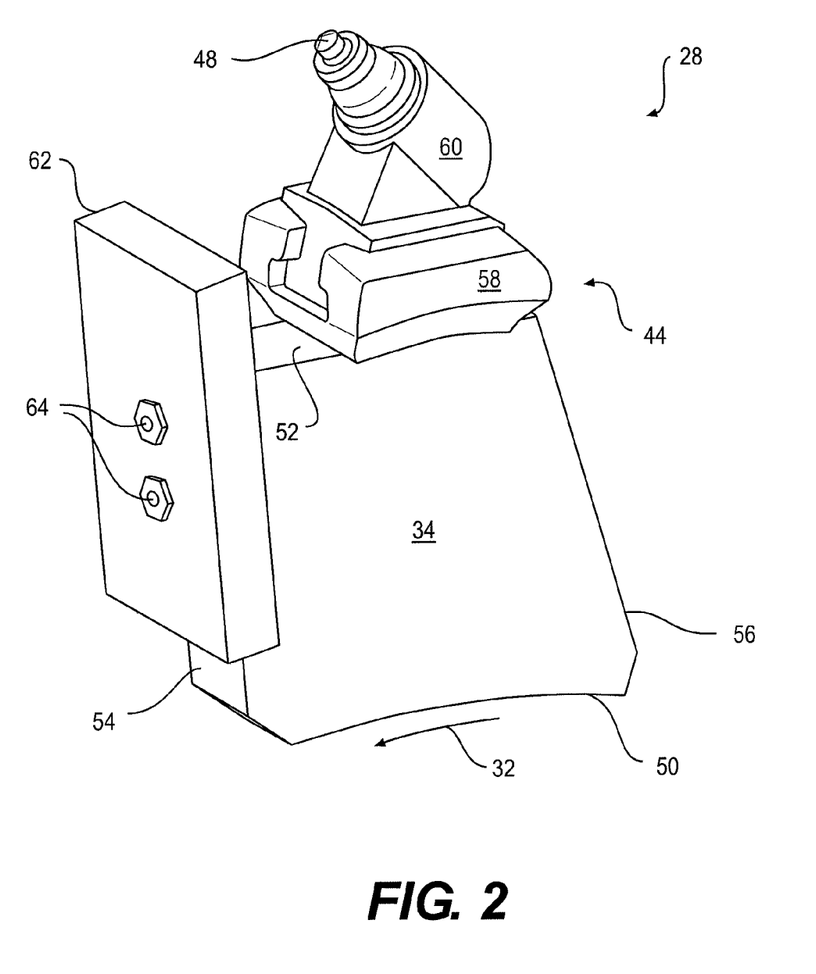
FIG. 2 is a pictorial illustration of an exemplary disclosed cutting tool that may be used in conjunction with the road reclaimer of FIG. 1.

As shown in FIG. 2, each cutting tool 28 may be formed by an individual flighting 34, a mounting block 44, and a cutting bit 48. Flightings 34 may be welded to outer surface 30 of rotary head 24, with one mounting block 44 fixedly connected to each flighting 34. A cutting bit 48 may be removably disposed within each mounting block 44.

Each flighting 34 may be plate-like and include a curved base end 50 and a generally flat distal end 52 located opposite base end 50. In one embodiment, flightings 34 may be separately cut from steel plate stock, although other materials and fabrication methods (e.g., cast or forged iron or steel) are also contemplated. Flighting 34 may include a leading edge 54 that extends from base end 50 to distal end 52, and a trailing edge 56 located opposite leading edge 54. Leading and trailing edges 54, 56 may be generally aligned with the rotational direction of reclaiming drum 16. One or more mounting features may be located within flighting 34 at leading edge 54. In one example (shown in FIG. 2), the mounting features may be blind threaded bores located within leading edge 54 at an upper end thereof (i.e., near distal end 52). In another example (shown in FIG. 4), the mounting features may be through holes located within the large planer sides of flighting 34 at a corner of distal end 52 and leading edge 54.

Each mounting block 44 may be fixedly connected to distal end 52 of a corresponding flighting 34, for example by welding, and configured to removably receive one cutting bit 48. Mounting block 44 may include a generally block-like base portion 58 that engages flighting 34, and a cylindrical tool holder portion 60 integrally formed therewith for holding cutting bit 48. An axis of tool holder portion 60 may be generally aligned with the rotational direction of rotary head 24. Cutting bit 48 may be received within tool holder portion 60 via a press-fit interference.

Cutting bit 48 may have a generally cylindrical body configured to be received within tool holder portion 60, and include a pointed hardened tip that engages roadway surface 20 during operation. In one example, the tip of cutting bit 48 may be fabricated from tungsten carbide, though other materials may also or alternatively be utilized. Although not shown, cutting bit 48 may also include a spring clip that surrounds the cylindrical body and functions to retain cutting bit 48 within tool holder portion 60, as is known in the art. In some embodiments, a washer may initially be located around the spring clip to hold the spring clip in a pre-loaded state, the washer then moving during assembly to an end of the spring clip to protect the corresponding tool holder portion 60 of mounting block 44 from relative movement of cutting bit 48.

As described above, during rotation of reclaiming drum 16, cutting tool 28 (including flighting 34, mounting block 44, and cutting bit 48) may be forced through roadway surface 20 and base 22. This material may be hard and abrasive, and impingement and rubbing of this material against cutting tool 28 may cause cutting tool 28 to wear. To help prolong the useful life of cutting tool 28, a kicker paddle 62 may be connected to cutting tool 28 to act as a sacrificial wear surface. In some applications, kicker paddle 62 may additionally function to enhance pulverization and mixing of the material. Kicker paddle 62 may be mounted to leading edge 54 of flighting 34 to protect flighting 34, and also extend a distance away from outer surface 30 of rotary head 24 to protect mounting block 44. In the disclosed embodiment, kicker paddle 62 may extend radially outward to an edge of cutting bit 48, although other configurations may alternatively be utilized if desired.

Figure 3:
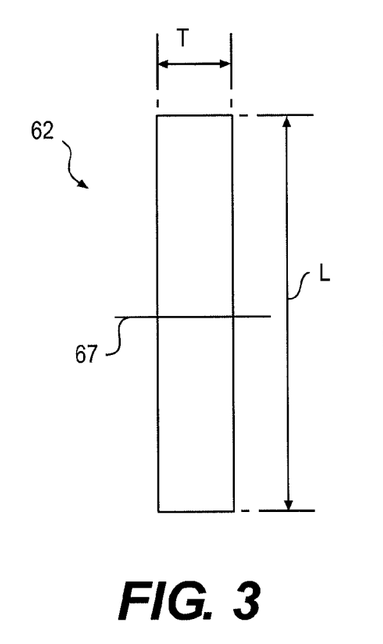
FIGS. 3-5 are side, front and end view pictorial illustrations of an exemplary disclosed kicker paddle that may be used in conjunction with the cutting tool of FIG. 2.
Figure 4:
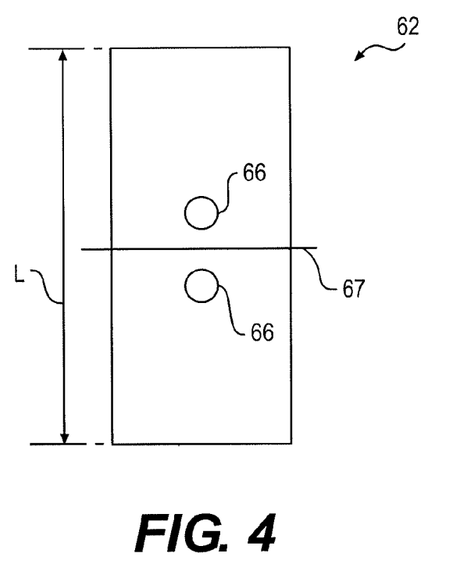
Figure 5:
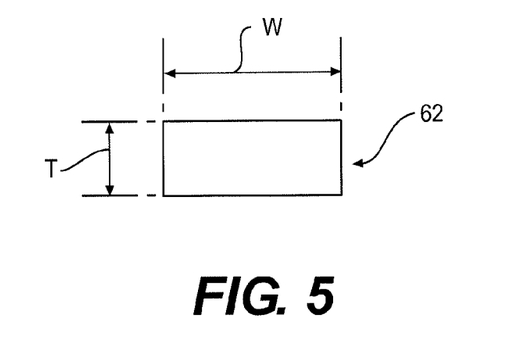

As shown in FIGS. 3-5, kicker paddle 62 may embody a rectangular block of abrasive-resistant material. In particular, kicker paddle 62 may have a length (L) that extends in the radial direction of reclaiming drum 16, a width (W) that is less than the length and extends in the axial direction of reclaiming drum 16, and a thickness (T) that is less than the width and extends in the rotational or circumferential direction of reclaiming drum 16.

Kicker paddle 62 may be removably mounted in a generally orthogonal orientation relative to flighting 34 (referring to FIG. 2), and the width thereof may be greater than the thickness of flighting 34. That is, kicker paddle 62 may extend in the axial direction of reclaiming drum 16 a distance past both sides of flighting 34. The location of kicker paddle 62 may help to protect leading edge 54 of flighting 34, while the width of kicker paddle 62 may help to deflect material away from the large planer sides of flighting 34. In one exemplary embodiment, the extension distance of kicker paddle 62 past the planer sides of flighting 34 may be about equal to a thickness of flighting 34, although other configurations may also be possible. Kicker paddle 62 may be mounted to flighting 34 by way of one or more threaded fasteners 64. In particular, fasteners 64 may act as a mounting mechanism and pass through holes 66 in kicker paddle 62 to engage the mounting features of flighting 34. In the disclosed embodiment, two holes 66 are formed within kicker paddle 62 and oriented in the length direction to align with leading edge 54 of fighting 34.

Kicker paddle 62 may be generally symmetric in the length direction. Specifically, a plane 67 passing through a center of kicker paddle 62 between holes 66 may define a vertical plane of symmetry for kicker paddle 62. With this configuration, kicker paddle 62 may be reversible. That is, after a period of use, an upper end of kicker paddle 62 (i.e., the end of kicker paddle 62 extending past fighting 34 toward mounting block 44) may wear. Rather than replacing a worn kicker paddle 62 with a new kicker paddle 62, the worn kicker paddle may instead simply be inverted (turned by about 180°) and used for an extended period of time.

Figure 6:
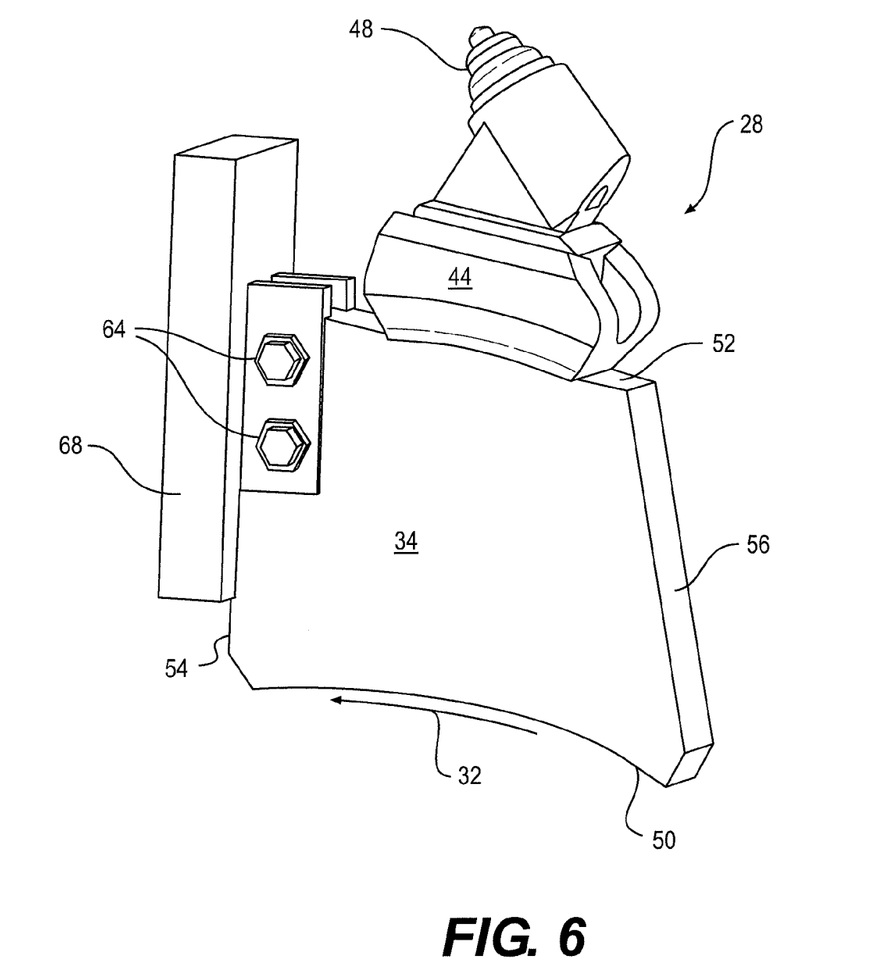
FIG. 6 is a pictorial illustration of another exemplary disclosed cutting tool that may be used in conjunction with the road reclaimer of FIG. 1.
Figure 7:
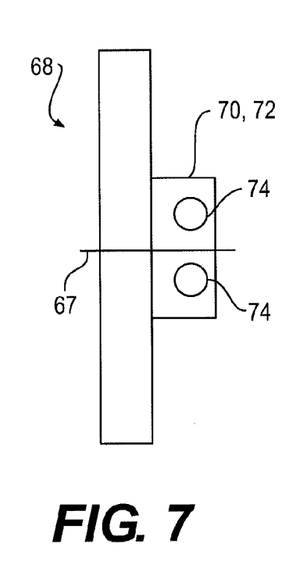
FIGS. 7-10 are left-side, front, right-side, and end view pictorial illustrations of an exemplary disclosed kicker paddle that may be used in conjunction with the cutting tool of FIG. 6.
Figure 8:
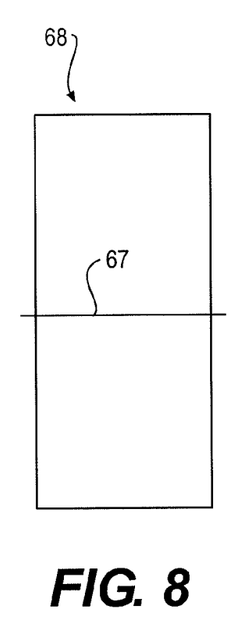
Figure 9:
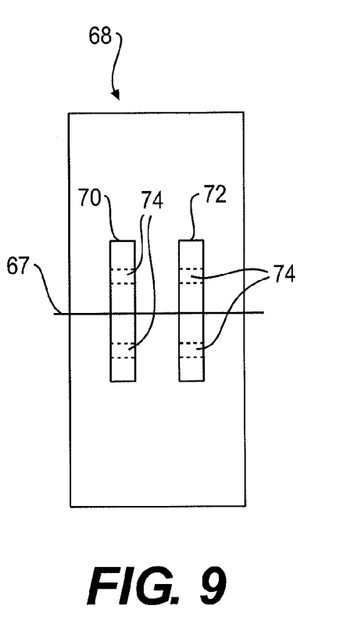
Figure 10:
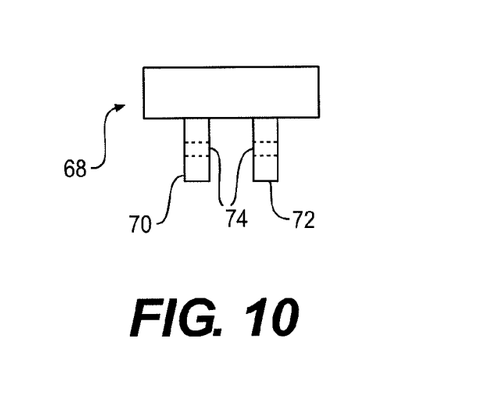

An alternative cutting tool 28 is illustrated in FIG. 6. Like cutting tool 28 of FIG. 2, cutting tool 28 of FIG. 6 may include flighting 34, cutting block 44, and cutting bit 48. In contrast to FIG. 2, however, cutting tool 28 of FIG. 6 may include a different kicker paddle 68. Like kicker paddle 62, kicker paddle 68 may be generally block-like, mount to leading edge 54 of flighting 34, and extend radially away from rotary head 24 to at least partially shield mounting block 44 from abrasion. The mounting mechanism of kicker paddle 68, may nevertheless be different. In particular, kicker paddle 68 may include first and second flange ears 70, 72 that protrude from an internal surface of kicker paddle 68.

As seen in FIGS. 7-10, first and second flange ears 70, 72 may be spaced apart in the width direction of kicker paddle 68 to engage the large planer side surfaces of flighting 34. Flange ears 70, 72 may be aligned with the length direction of kicker paddle 68, and have through holes 74 configured to receive fasteners 64. It is contemplated that nuts and washers (not shown) may be connected to the ends of fasteners 64 and/or that one of flange ears 70, 72 may be threaded at through holes 74 to engage fasteners 64, as desired. It is contemplated that, in some embodiments, flange ears 70, 72 may be recessed within the large planer surfaces of flighting 34, if desired. Kicker paddle 68 may be symmetrical in the length direction relative to plane 67, to provide the same reversible functionality of kicker paddle 62 described above.

The design of kicker paddle 68 may provide protection for fasteners 64 from the abrasive material pulverized by reclaiming drum 16. Specifically, the width of kicker paddle 68 may be greater than the thickness of flighting 34, such that kicker paddle 68 extends a distance past the large planer sides of flighting 34. In one embodiment, the extension distance of kicker paddle 68 past the sides of flighting 34 may be about the same or greater than a distance that fasteners 64 extend past the sides of flighting 34. Accordingly, this extension of kicker paddle 68 may create protective pockets at the internal sides thereof that receive and shield the ends of fasteners 64. By protecting the ends of fasteners 64, fasteners 64 may wear less over time and allow for easier removal.

Figure 11:
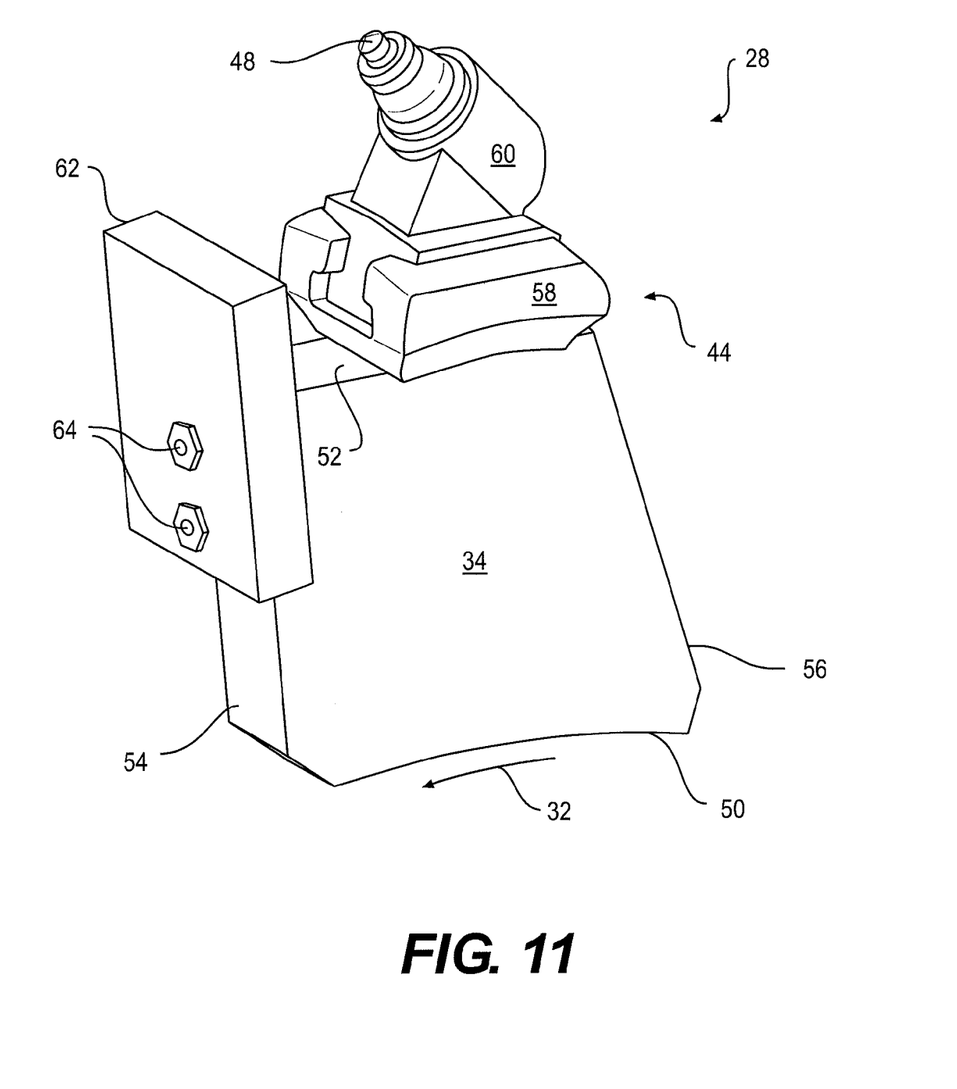
FIG. 11 is a pictorial illustration of another exemplary disclosed cutting tool that may be used in conjunction with the road reclaimer of FIG. 1.
Figure 12:
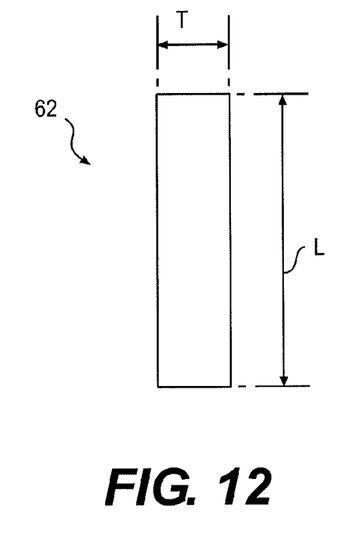
FIGS. 12-14 are side, front and end view pictorial illustrations of an exemplary disclosed kicker paddle that may be used in conjunction with the cutting tool of FIG. 2.
Figure 13:
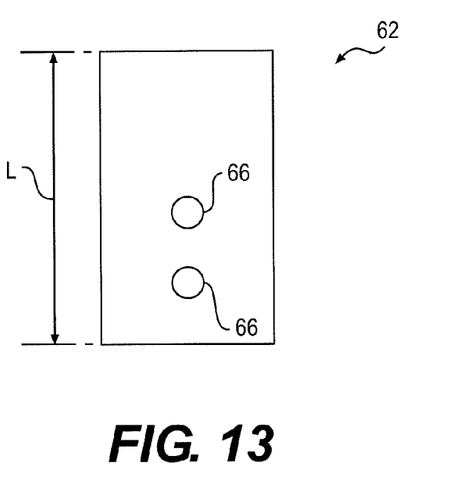
Figure 14:
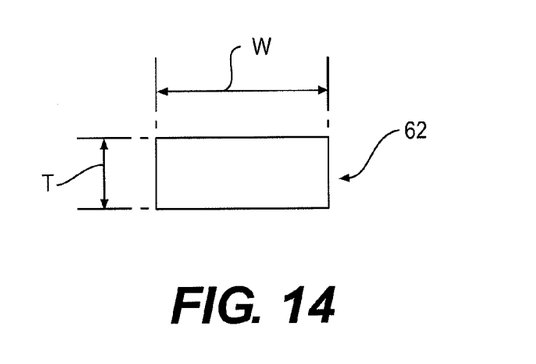

An alternative cutting tool 28 is illustrated in FIG. 11. Cutting tool 28 of FIG. 11 may be substantially identical to cutting tool 28 of FIG. 2, except for the length and symmetry of kicker paddle 62. Specifically, as seen in FIGS. 11-14, kicker paddle 62 of this embodiment may is shorter than depicted in FIG. 2 and no longer symmetric relative to holes 66.

Figure 15:
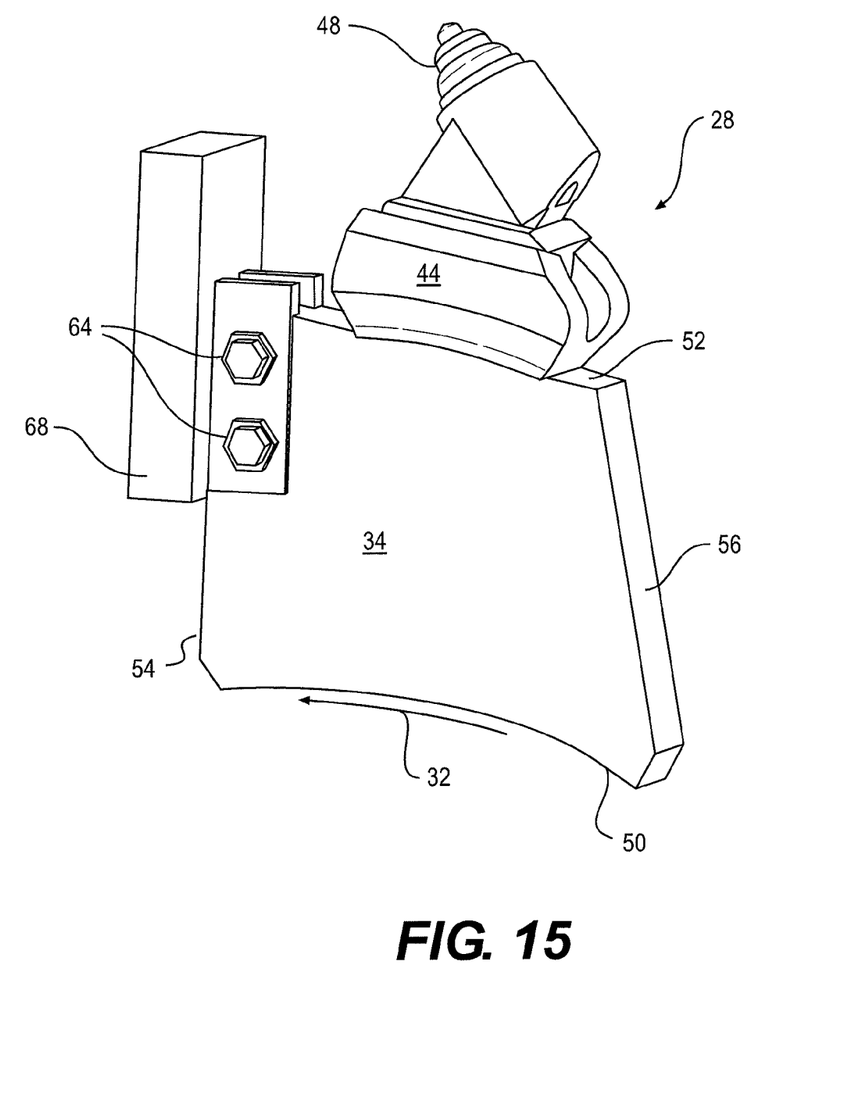
FIG. 15 is a pictorial illustration of another exemplary disclosed cutting tool that may be used in conjunction with the road reclaimer of FIG. 1.
Figure 16:
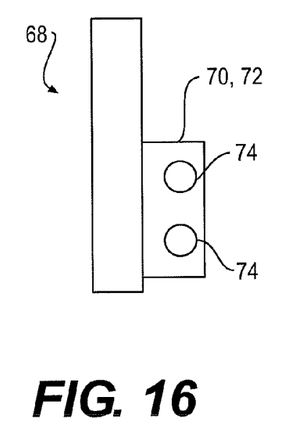
FIGS. 16-19 are left-side, front, right-side, and end view pictorial illustrations of an exemplary disclosed kicker paddle that may be used in conjunction with the cutting tool of FIG. 6.
Figure 17:
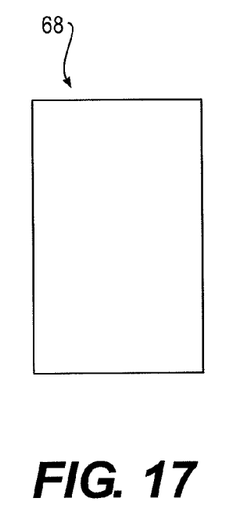
Figure 18:
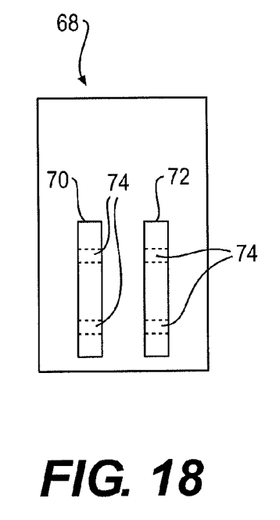
Figure 19:
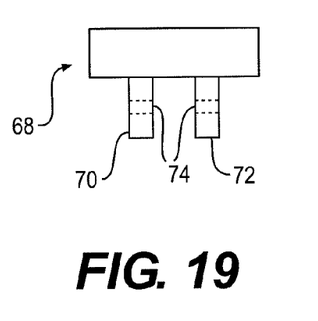

An additional cutting tool 28 is illustrated in FIG. 15. Cutting tool 28 of FIG. 15 may be substantially identical to cutting tool 28 of FIG. 6, except for the length and symmetry of kicker paddle 68. Specifically, as seen in FIGS. 15-19, kicker paddle 68 of this embodiment is shorter than depicted in FIG. 6 and no longer symmetric relative to holes 74.

Industrial Applicability

The disclosed kicker paddles and reclaiming drum may be used within any road reclaimer for the fragmenting, pulverizing, and mixing of roadway surface material. The disclosed kicker paddles and reclaiming drum may improve longevity of machine components, while also decreasing servicing difficulty, time, and expense. Component longevity may be increased through the unique design of the disclosed kicker paddles that functions to protect the associated cutting tools from excessive wear. This unique design may allow the kicker paddles to be selectively inverted for extended use. The unique design may also include features that provide protection for fasteners that hold the kicker paddles in place. By providing this protection, the fasteners may wear less and be easier to remove during servicing. In addition, the removable nature of the kicker paddles may reduce service difficulty, time, and expense.

After one end of kicker paddles 62, 68 has been worn to a point that it no longer adequately protects the associated cutting tool 28, the worn kicker paddles 62, 68 may either be re-oriented to place the opposing end upward in front of mounting block 44 or completely replaced. To re-orient or replace kicker paddles 62, 68, fasteners 64 may be loosened and removed (e.g., removed from holes 66, 74 and the protective pocket formed by kicker paddle 68). Kicker paddles 62, 68 may then be detached from leading edge 54 of the associated flighting 34, inverted (or replaced), and reattached in its inverted orientation. Fasteners 64 may then be reinserted through holes 66, 74 of kicker paddles 62, 68 and tightened.

It will be apparent to those skilled in the art that various modifications and variations can be made to the disclosed kicker paddles and reclaiming drum without departing from the scope of the disclosure. Other embodiments of the kicker paddles and reclaiming drum will be apparent to those skilled in the art from consideration of the specification and practice of the kicker paddles and reclaiming drum disclosed herein. It is intended that the specification and examples be considered as exemplary only, with a true scope of the disclosure being indicated by the following claims and their equivalents.

What is claimed is:

1. A kicker paddle for a reclaiming drum, comprising:
a block having a first end and a second end; and
a mounting mechanism located between the first and second ends, the mounting mechanism including:
a first ear connected to an inner surface of the block; and
a second ear connected to the inner surface of the block and spaced apart from the first ear in a width direction of the block to receive a flighting of the reclaiming drum between the first and second ears,
wherein the kicker paddle is symmetric relative to a plane passing through the mounting mechanism that is parallel to the first and second ends.

2. The kicker paddle of claim 1, further including at least one fastener configured to pass through the first ear, the flighting, and the second ear to connect the kicker paddle to the flighting.

3. The kicker paddle of claim 2, wherein the block extends past the first and second ears in the width direction to provide protection to opposing ends of the at least one fastener.

4. The kicker paddle of claim 3, wherein the at least one fastener includes two fasteners spaced apart in a length direction of the block.

5. The kicker paddle of claim 3, wherein the block is generally rectangular and extends past the first and second ears in a length direction.

6. A cutting tool for a reclaiming drum, comprising:
a plate-like flighting configured to be connected to the reclaiming drum at a first end in general alignment with a rotational direction of the reclaiming drum;
a rectangular block removably connectable to a leading edge of the plate-like flighting in an orthogonal orientation relative to the rotational direction of the reclaiming drum, the rectangular block having a first end and a second end;
a mounting mechanism located between the first and second ends, wherein the rectangular block is symmetric relative to a plane passing through the mounting mechanism that is parallel to the first and second ends; and
a cutting bit operatively connected to a second end of the plate-like flighting opposite the reclaiming drum,
wherein the mounting mechanism includes:
first ear connected to an inner surface of the rectangular block; and
a second ear connected to the inner surface of the rectangular block and spaced apart from the first ear in a width direction of the rectangular block to receive the plate-like flighting between the first and second ears.

7. The cutting tool of claim 6, further including at least one fastener passing through the first ear, the flighting, and the second ear to connect the rectangular block to the plate-like flighting.

8. The cutting tool of claim 7, wherein the rectangular block extends past the first and second ears in the width direction to provide protection to opposing ends of the at least one fastener.

9. The cutting tool of claim 8, wherein the at least one fastener includes two fasteners spaced apart in a length direction of the rectangular block.

10. The cutting tool of claim 8, wherein the rectangular block extends past the first and second ears in a length direction.

11. The cutting tool of claim 6, wherein the rectangular block extends a distance away from the reclaiming drum to an edge of the cutting bit.

12. The cutting tool of claim 11, further including a tool mounting block operatively connected to the second end of the flighting, wherein the rectangular block extends away from the reclaiming drum past the tool mounting block.

13. A method of servicing a reclaiming drum, comprising:
removing at least one fastener that passes through a kicker paddle and a flighting;
detaching the kicker paddle from the flighting;
inverting the kicker paddle;
reattaching the kicker paddle to the flighting; and
reinserting the at least one fastener back through the kicker paddle and the flighting,
wherein removing the at least one fastener includes removing the at least one fastener from opposing flange ears of the kicker paddle that are located at opposing sides of the flighting and orthogonal to a rectangular block of the kicker paddle.

14. The method of claim 13, wherein removing and reinserting the at least one fastener includes removing and reinserting two fasteners, the two fasteners being aligned with each other in a length direction of the kicker paddle.

15. The method of claim 13, wherein removing the at least one fastener includes removing the at least one fastener from a protective pocket located between a flange and a block of the kicker paddle.

16. A reclaiming drum, comprising:
a head having a cylindrical outer surface;
a plurality of flightings separately welded at a first end to the reclaiming drum at spaced apart locations;
a tool mounting block fixedly connected to a second end of each of the plurality of flightings;
a cutting bit disposed within each tool mounting block;
a kicker paddle removably connected at a leading edge of each of the plurality of flightings; and
at least one fastener passing in an axial direction of the head through opposing flange ears of the kicker paddle and the corresponding one of the plurality of flightings,
wherein the flange ears are located at about a lengthwise mid-point of the kicker paddle.

17. The reclaiming drum of claim 16, wherein the kicker paddle includes a block disposed in an orthogonal orientation relative to the associated one of the plurality of flightings, the block extending in a width direction past the flange ears to create protective pockets for the at least one fastener.

\* \* \* \* \*

UNITED STATES PATENT AND TRADEMARK OFFICE
CERTIFICATE OF CORRECTION

| | |
|---|---|
| PATENT NO. | : 8,870,297 B2 |
| APPLICATION NO. | : 13/526944 |
| DATED | : October 28, 2014 |
| INVENTOR(S) | : Pederson et al. |

It is certified that error appears in the above-identified patent and that said Letters Patent is hereby corrected as shown below:

Specification

Column 5, line 43, delete "Industrial Applicability" and insert -- INDUSTRIAL APPLICABILITY --.

Signed and Sealed this
Seventeenth Day of November, 2015

Michelle K. Lee
*Director of the United States Patent and Trademark Office*